United States Patent
Hinken et al.

(10) Patent No.: US 12,553,411 B2
(45) Date of Patent: Feb. 17, 2026

(54) METHOD FOR CONTROLLING A YAW SYSTEM OF A WIND TURBINE

(71) Applicant: General Electric Renovables España, S.L., Barcelona (ES)

(72) Inventors: Frank Hinken, Salzbergen (DE); Hartmut Scholte-Wassink, Salzbergen (DE); Mattia D'Angelo, Barcelona (ES); Sebastian Wiemer, Wedel (DE)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/910,408

(22) Filed: Oct. 9, 2024

(65) Prior Publication Data

US 2025/0116253 A1  Apr. 10, 2025

(30) Foreign Application Priority Data

Oct. 9, 2023 (EP) ..................................... 23383033

(51) Int. Cl.
*F03D 7/02* (2006.01)
*F03D 80/70* (2016.01)

(52) U.S. Cl.
CPC ......... *F03D 7/0204* (2013.01); *F03D 7/0244* (2013.01); *F03D 80/701* (2023.08); *F05B 2240/50* (2013.01)

(58) Field of Classification Search
CPC .... F03D 7/0204; F03D 7/0244; F03D 7/0248; F03D 7/0292; F05B 2270/331; F05B 2270/332; F05B 2260/90
See application file for complete search history.

(56) References Cited

U.S. PATENT DOCUMENTS 8,177,510 B2 * 5/2012 Nies .................... F03D 80/00
416/169 R
11,614,072 B2 * 3/2023 Nohara ................ F03D 7/0224
416/1
(Continued)

FOREIGN PATENT DOCUMENTS

CN   112 160 871 A   1/2021

OTHER PUBLICATIONS

European Search Report Corresponding to EP23383033 Mar. 25, 2024.

*Primary Examiner* — Brian P Wolcott
(74) *Attorney, Agent, or Firm* — Dority & Manning, P.A.

(57) ABSTRACT

The present disclosure relates to a method (100) for operating a yaw system of a wind turbine (10), the yaw system comprising a yaw bearing (98), an annular gear (31) and a plurality of yaw drives (35) including a motor (33) with a motor brake (91), a gearbox (37) and a pinion (39) operatively connected with the motor (33). The method (100) comprises operating the plurality of yaw drives (35) to rotate a nacelle (16) with respect to a tower (15) of the wind turbine (10). The method further comprises stopping rotation of the nacelle (16) with respect to the tower (15), including closing the motor brakes (91) of the yaw drives (35). Furthermore, the method (100) comprises, after a waiting time, balancing loads experienced by the plurality of yaw drives (35) of the yaw system. The present disclosure also relates to a control system (92) for a wind turbine (10) that is configured to carry out such method (100).

12 Claims, 7 Drawing Sheets

(56) References Cited

U.S. PATENT DOCUMENTS

| | | | |
|---|---|---|---|
| 11,732,689 B2* | 8/2023 | Kodama | F03D 7/042 |
| | | | 415/118 |
| 11,754,039 B1* | 9/2023 | Gauchel | F03D 7/0204 |
| | | | 416/9 |
| 12,123,396 B2* | 10/2024 | Bertelsen | F03D 7/0244 |
| 2021/0199088 A1* | 7/2021 | Nohara | F03D 7/0248 |
| 2025/0059948 A1* | 2/2025 | Pedersen | F03D 7/0248 |

* cited by examiner

METHOD FOR CONTROLLING A YAW SYSTEM OF A WIND TURBINE

The present disclosure relates to wind turbines, and more particularly, to yaw systems and methods for controlling yaw systems of wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a moment that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

Wind turbines usually comprise a yaw system for rotating the rotor and the nacelle with respect to the tower about a longitudinal axis of the tower.

During power production operation, the direction of the wind may change. When the wind turbine rotor is misaligned with respect to the wind direction, the yaw system rotates the nacelle about a longitudinal axis of the tower to reach an alignment with the wind. The determination that the nacelle and rotor are no longer aligned with the prevailing wind direction may be made based e.g. on a weather vane mounted on the nacelle. However, other methods based on measuring loads and/or oscillations are also known. Generally, the yaw system may be activated if the prevailing wind direction deviates from the rotor and nacelle orientation by more than a predefined threshold (e.g. 5°, 7°, or 10° or more) for at least a predetermined period of time. A predetermined period of time may be 1 minute, 5 minutes, 10 minutes or more. Seconds to minute averages, e.g. 3 second, 10 second, 1 minute, or 5 minute averages, may for example be determined to calculate the direction of the prevailing wind speed.

Other modes of operation may also involve rotation of the nacelle about the longitudinal axis of the tower. An example is a cable untwist operation. Wind turbines comprise cables (power cables and/or other cables) that may be fixed at their ends, e.g. from a component in the nacelle to some other component at some point in the tower. As a result of the previously mentioned rotation during power production operation, the cables may become twisted. Generally, a twist limit exists beyond which the cables may be damaged. Before such limit is reached, the cables need to be untwisted. To this end, an untwist operation of a wind turbine may comprise stopping the wind turbine and yawing the nacelle until a certain predetermined orientation is reached in which the cables are not substantially twisted.

Another mode of operation that may involve rotation of the nacelle is yaw rotation during idling, i.e. during a situation when there is no power production. Thus, even if the wind turbine is not generating any power, it may still be subjected to prevailing loads induced by wind or, in the case of offshore wind turbines, by sea waves. The yaw system may be configured to rotate the nacelle to keep loads within design margins. In some cases, the nacelle may be rotated so that the rotor is facing the wind (i.e. upwind orientation) in a similar fashion as when the wind turbine is in power production mode. In some other cases, it may be preferable to yaw the nacelle out of the wind when the wind turbine is in idling mode. This may be the case if, e.g. a fault is present and a blade is stuck (the blade cannot be pitched). Furthermore, it is known that some control strategies keep track of the wind direction while the wind turbine is in idling, not only for load control, but also to provide better alignment with the wind so as to reduce start-up delays when the wind speed increases into an operating range.

The yaw system normally performs the rotation of the nacelle using a plurality of yaw drives that includes a plurality of motors, e.g. electric or hydraulic motors, with suitable gearboxes for driving gears (pinions) that mesh with an annular gear or gear ring attached to the nacelle or to the wind turbine tower. The nacelle can thus be rotated around the longitudinal axis of the tower in or out of the wind direction. The rotatable connection between the wind turbine tower and the nacelle is called a yaw bearing. The yaw bearing can be of the roller or gliding type.

Normally, when the rotor is positioned according to the desired orientation, a system is used to maintain the state and retain the nacelle in position. Thus, the yaw system maintains the orientation by the use of brakes, e.g. hydraulic brake calipers and/or motor brakes of the yaw motors. These brakes can be activated and deactivated by the wind turbine control system. Furthermore, the pinions of the yaw drives remain engaged with the annular gear or gear ring so they also contribute to increase the capability of the wind turbine to maintain the nacelle in position, i.e. with the desired orientation.

The term parked wind turbine or parked nacelle may be used to refer to the state involving maintaining the orientation of the nacelle in a given position. It should be understood that this situation may occur under different operating conditions, including but not limited to, power production and idling operations. It is important to note that this situation corresponds to most of a wind turbine's lifetime.

It has surprisingly been found that, in some situations, even though the distribution of yaw motors is symmetric, the aforementioned operation to retain a desired orientation can lead to overloading of individual components of the yaw system and, more particularly, to overloading of individual yaw drives and the corresponding yaw pinions.

The present disclosure seeks to provide improved methods for operating a yaw system of a wind turbine, in particular during stopping of yawing and during a parked state. The present disclosure also seeks to provide wind turbines that at least partially reduce the aforementioned problems.

SUMMARY

In an aspect of the present disclosure, a method for operating a yaw system of a wind turbine is provided. The yaw system comprises a yaw bearing, an annular gear and a plurality of yaw drives. The yaw drives include a motor with a motor brake, a gearbox and a pinion operatively connected with the motor. The method comprises operating the plurality of yaw drives to rotate a nacelle with respect to a tower of the wind turbine. The method further comprises stopping rotation of the nacelle with respect to the tower, including stopping the motors and closing the motor brakes of the yaw drives. After a waiting time, the method comprises balancing loads experienced by the plurality of yaw drives of the yaw system.

According to this aspect, the yaw operation is such that motor brakes are closed, i.e. activated, to stop rotation of the nacelle with respect to the tower to end a yaw rotation operation. Stopping rotation of the nacelle with respect to the tower also comprises stopping the yaw motors. In some variants of the disclosure, the motor brakes may be closed simultaneously with stopping the motors. In other variants, motor brakes may be closed after stopping the motors. In any case, after a waiting time, which may be defined from the moment the motor brakes are closed, loads experienced by the plurality of yaw drives of the yaw system are balanced.

Throughout the present disclosure, "balancing loads" may be interpreted as reducing an existing imbalance among loads experienced by a plurality of yaw drives. Thus, a more balanced system is achieved after the "balancing loads" action and the imbalance is reduced. In some cases, this reduction may lead to a so-called perfectly balanced system in which all yaw drives experience substantially the same load. In other cases, the "balancing loads" action may reduce the difference among loads experienced by the multiple drives even if said loads may remain different.

Inventors have discovered a significant imbalance between the loads suffered by individual yaw drives when the nacelle is stopped, i.e. in a parked state. In spite of a symmetric distribution, load sharing among the yaw drives is not uniform as the pinions of each yaw drive mesh with the annular gear at a different position so that pinions are not loaded equally. Inventors have identified that this position is dependent on several factors, such as variance in the closing time of the motor brakes, individual pinion backlash or yaw motor brake wear. These different positions result in a residual load that translates into an uneven loading of the yaw pinions. The parked state occurs during long periods of time and it represents most of the lifetime of a wind turbine, so such uneven loading can result in loads exceeding the design load of the respective yaw drive. Consequently, components of the yaw drives may become overloaded and damaged.

A balancing loads action after stopping rotation of the nacelle has been found to reduce previously found risks of component overloading. The balancing loads action has been found to passively relax the residual loads on the multiple yaw drives. It has been found that the remaining load is more evenly distributed among the plurality of yaw drives.

In an example of the disclosure, balancing loads experienced by the plurality of yaw drives may comprise temporarily reducing a braking friction. Thus, by reducing the braking friction in the yaw system for a certain period of time, a balancing of loads experienced by the multiple yaw drives may be achieved.

In a further example, balancing loads experienced by the plurality of yaw drives of the yaw system may comprise opening the motor brakes during an opening time and closing the motor brakes after the opening time. Thus, the motor brakes are opened, i.e. released, during a so-called opening time, after which the motor brakes are closed again. In other words, an open-close action is carried out for the motor brakes after stopping rotation of the nacelle.

Throughout the present disclosure, an "open-close action" may be regarded as a temporary (relatively short) opening of the yaw brakes, specifically the motor brakes, to subsequently close the brakes again. I.e. the brakes are released for a short period of time to then be activated again. In particular, the yaw drives are not activated during an open-close action, i.e. the motors are not driven to move a position of the nacelle.

An open-close action, i.e. releasing or lifting the motor brakes during an opening time, more specifically during a short amount of time, after stopping rotation of the nacelle, has been found to temporarily reduce the braking friction and passively relax the residual loads on the multiple yaw drives. It has been found that the remaining load is more evenly distributed among the plurality of yaw drives, thus leading to a more balanced load distribution with reduced risk of component overloading.

In another aspect of the present disclosure, another method for operating a yaw system of a wind turbine is provided. The yaw system comprises a yaw bearing, an annular gear, a hydraulic brake, and a plurality of yaw drives, which include a motor with a motor brake, a gearbox and a pinion operatively connected with the motor. As in the previous example, the method comprises operating the plurality of yaw drives to rotate a nacelle with respect to a tower of the wind turbine. Nevertheless, in this example, the hydraulic brake is actuated to increase the braking pressure with respect to its average value during rotating of the nacelle. Subsequently, the method comprises stopping rotation of the nacelle with respect to the tower, including stopping the motors and closing the motor brakes. Subsequentially, a waiting time after closing the motor brakes, the motor brakes are opened during an opening time. Finally, the method comprises closing the motor brakes again after the opening time.

According to this aspect of the disclosure, the hydraulic brake is actuated before the end of the yaw operation so that the braking pressure of the hydraulic brake increases with respect to its average value while rotating the nacelle. The early actuation of the hydraulic brake takes place at a specific moment before stopping rotating the nacelle, i.e. a determined time before stopping the yaw motors. Said determined time may be a predefined amount of time obtained by, e.g. simulation, or it may be determined on the basis of operating conditions. Stopping of the nacelle also comprises closing the motor brakes, which may occur simultaneously or with some delay with respect to the stopping of the yaw motors.

It is known in the art that hydraulic brakes can be actuated with a certain hydraulic pressure during the rotation of the nacelle to exert a braking moment. This braking moment is used to provide damping during the yawing operation and it typically involves operating the hydraulic brake in a range of 20-40% of its braking pressure, with the specific value being dependent on different factors such as yaw bearing type (rollers, sliding) or operating conditions. Inventors have found that by increasing the pressure of the hydraulic brake early, i.e. before stopping the rotation of the nacelle by stopping the motors and closing the motor brakes, a quicker stand still is reached which translates in a reduced imbalance in the loads suffered by the yaw drives. This effect, in combination with the open-close action of the motor brakes already described with regard to the previous aspect, contributes to further balancing the loads among the yaw pinions.

In yet a further aspect of the disclosure, a control system for a wind turbine is provided. The control system is configured to carry out any examples of the methods according to the aforementioned aspects. For example, the control system is configured to instruct operation of the plurality or yaw drives to rotate the nacelle with respect to the tower during the yawing operation and then to instruct closing of the motor brakes for stopping rotating the nacelle. Subsequently, after a waiting time, the control system is configured to instruct a balancing of loads experienced by the plurality of yaw drives of the yaw system. In an example, balancing of loads may involve the control systems instructing opening of the motor brakes during an opening time before instructing closing of the motor brakes.

According to this further aspect of the disclosure, an example of a system that can be arranged in a wind turbine is provided. This control system is able to implement a method to control a yaw system during a yaw sequence and, more specifically, during a parked state of the wind turbine after ending a yawing operation.

Still in a further aspect of the disclosure, a wind turbine is provided. The wind turbine comprises a tower, a nacelle rotatably mounted on the tower, and a yaw system for rotating the nacelle with respect to the tower around a longitudinal axis of the tower. The wind turbine furthermore comprises such a control system.

DETAILED DESCRIPTION OF EXAMPLES

Figure 1:
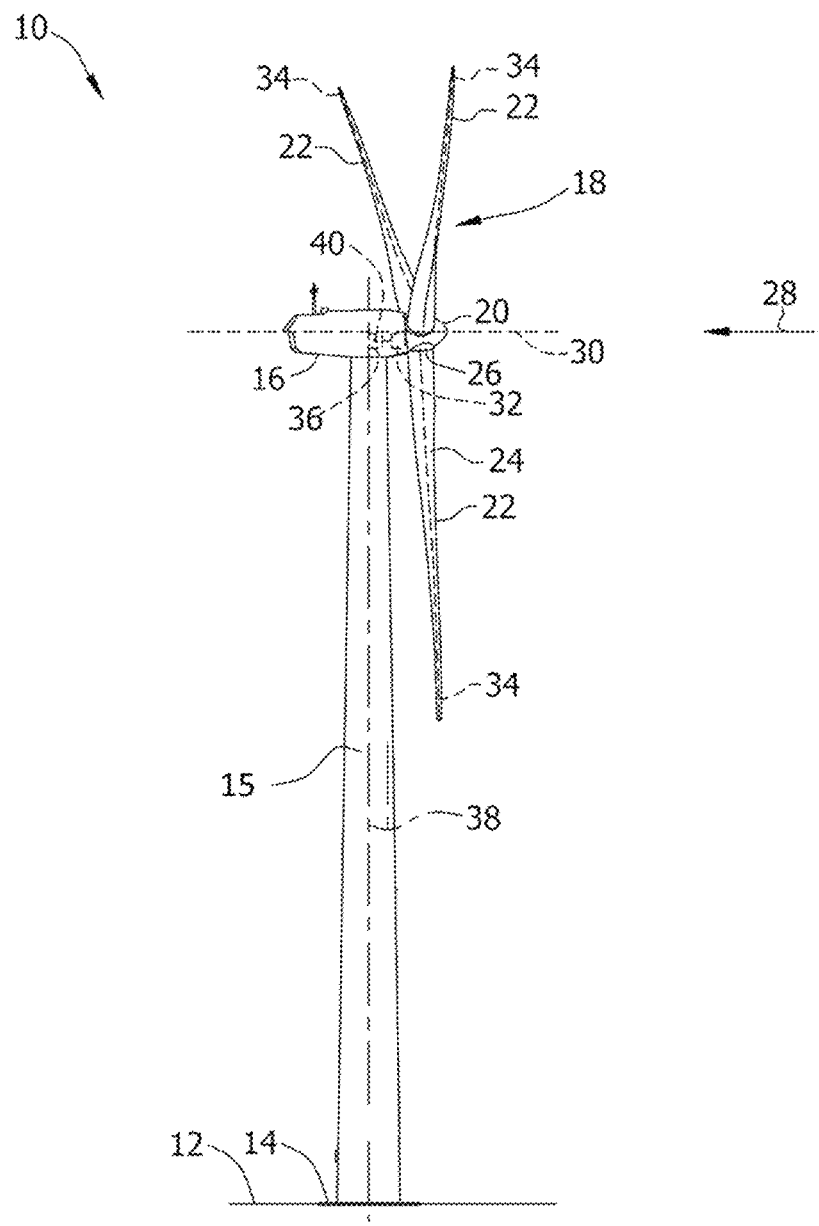
FIG. 1 illustrates a perspective view of one example of a wind turbine.

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power output by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a nacelle 16 may be rotated about the longitudinal axis of the tower, i.e. about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
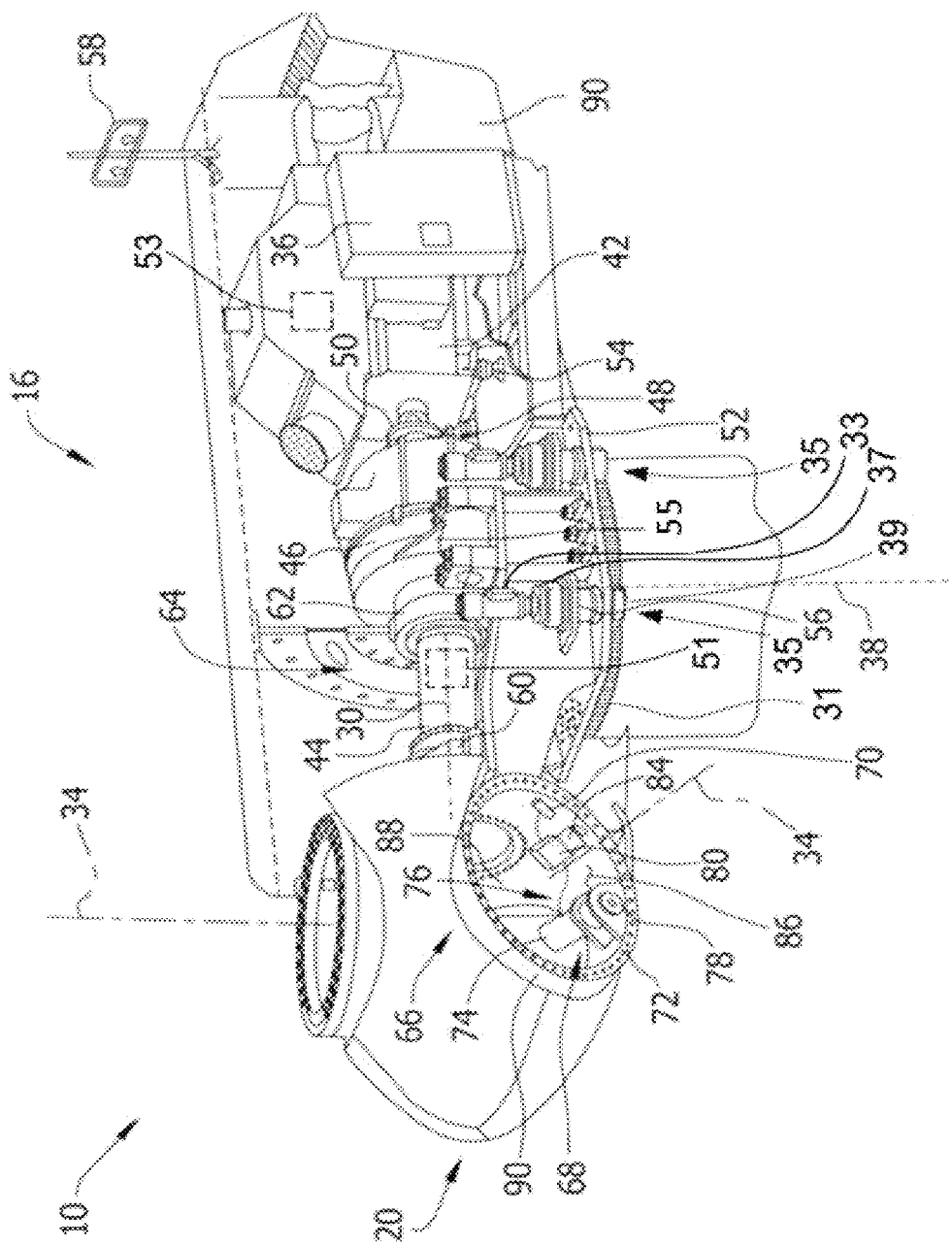
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 55. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw system which comprises a yaw bearing (not visible in FIG. 2) having two bearing components configured to rotate with respect to the other. The tower 15 is coupled to one of the bearing components and the bedplate or support frame 52 of the nacelle 16 is coupled to the other bearing component.

The yaw system may comprise an annular gear 31 and a yaw drive mechanism 56 that may be used to rotate the nacelle 16 and thereby also the rotor 18 about the longitudinal axis of the tower, i.e. about a yaw axis 38 to control the perspective of the rotor blades 22 with respect to the wind direction 28.

The yaw drive mechanism 56 may comprise a plurality of yaw drives 35 with a motor 33, a gearbox 37 and a pinion 39 for meshing with the annular gear 31 for rotating one of the bearing components with respect to the other. The annular gear 31 may comprise a plurality of teeth which engage with the teeth of the pinion 39. In the example of FIG. 2, the yaw drives 35 and the annular gear 31 are placed outside the external diameter of the tower. The teeth of the annular gear are outwardly orientated, but in other examples, the annular gear and yaw drives may be arranged at the inside of the tower.

In some examples, one of the yaw drives may be a "master", and the other drives may be "slaves" following the instructions of the master or adapting their operation to adapt to the master drive.

The turbine controller 36 may be communicatively coupled to the yaw drive mechanism 56 of the wind turbine 10 for controlling and/or altering the yaw direction of the nacelle 16 relative to the wind direction 28. As the direction of the wind 28 changes, the wind turbine controller 36 may be configured to control a yaw angle of the nacelle 16 about the longitudinal axis of the tower or yaw axis 38 to position the rotor blades 22, and therefore the rotor 18, with respect to the direction 28 of the wind, thereby controlling the loads acting on the wind turbine 10. For example, the turbine controller 36 may be configured to transmit control signals or commands to the yaw drive mechanism 56 of the wind turbine 10, via a yaw controller or direct transmission, such that the nacelle 16 may be rotated about the longitudinal axis of the tower or yaw axis 38 via a yaw bearing.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
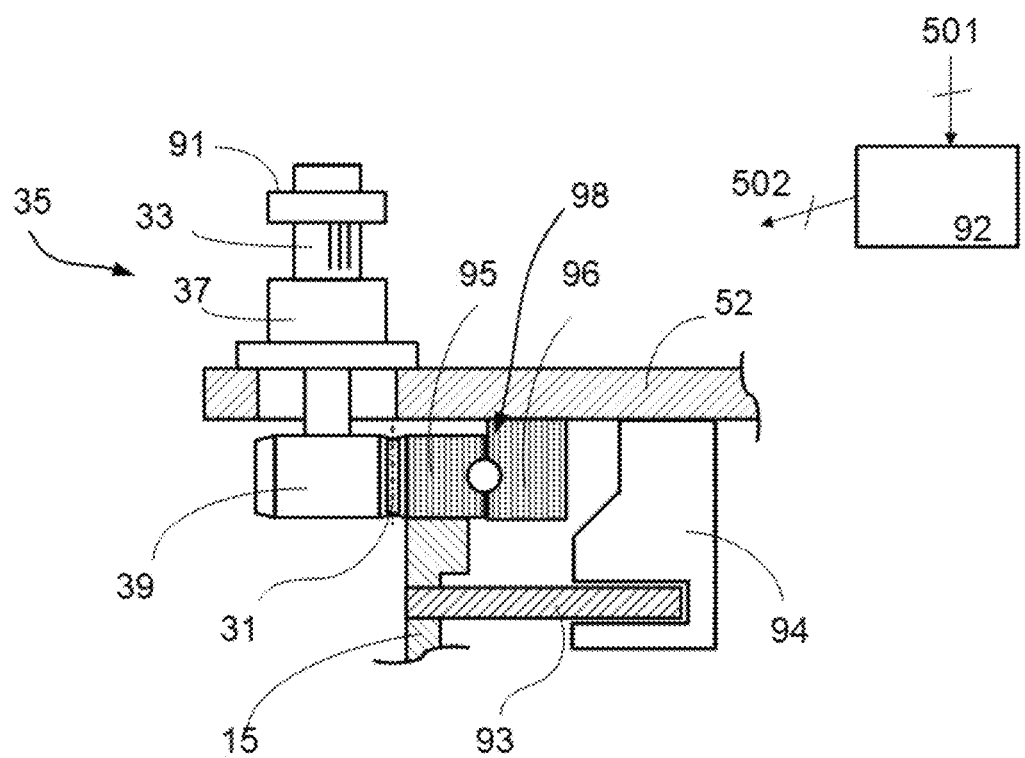
FIG. 3 schematically illustrates an example of a portion of a yaw system according to an example.

FIG. 3 illustrates a portion of a yaw system according to one example. The yaw system comprises a yaw bearing 98 having a first bearing component 95 coupled to the tower 15 and a second bearing component 96 coupled to the main frame 52 of the nacelle 16. The yaw system comprises an annular gear 31 which, in this example, is coupled to the first bearing component 95. Other configurations are also possible such as, e.g. the annular gear 31 may be coupled to the tower 15. The yaw system comprises a yaw drive 35 and the yaw drive 35 in this example comprises a motor 33, which comprises a motor brake 91, a gearbox 37 and a pinion 39 for meshing with the annular gear 31. The rotation of the motor 33 rotates the pinion 39 with respect to the annular gear 31. As mentioned, in this example the annular gear 31 is coupled to the stationary first bearing component 95 mounted on the tower 15, so the second bearing component 96 coupled to the main frame 52 rotates with respect to the first bearing component 95. Although only a single yaw drive 35 is shown in FIG. 3, multiple yaw drives 35, each with its motor 33, gearbox 37 and pinion 39 may be provided around the circumference to engage with the annular gear 31.

The annular gear 31 may comprise a plurality of teeth which engage with the teeth of the pinion 39. In this example, the yaw drive 35 and the annular gear 31 are placed outside the external diameter of the tower. The teeth of the annular gear 31 are outwardly oriented. However, in other examples, the annular gear 31 and the yaw drive 35 may be placed inside the tower.

The motor brake 91 may be arranged inside the housing of the motor 33 and it may be arranged to block rotation of the motor 33. The motor brake 91 may comprise a friction brake where a friction disk may be secured to the rotatable shaft of the electric motor 33. The friction disk may be configured to engage a non-rotating surface, thus exerting a braking moment on the system.

The yaw system of FIG. 3 further comprises a braking disk 93 and a hydraulic brake 94 configured to exert a braking force on the braking disk 93 for braking the rotation of the first bearing component 95 with respect to the second bearing component 96. Although only a single hydraulic brake 94 is shown, a plurality of brakes 94 may be provided along the circumference of the tower 15 so as to engage the braking disk 93 at different points. The braking disk 93 is connected to the tower 15. In other examples, the braking disk 93 may be integrally formed with the tower 15. The hydraulic brake 94 may comprise a brake caliper attached to the support frame 52 and may engage the brake disk 93 to prevent rotation of the nacelle 16 with respect to the tower 15.

In order to activate the brake 94, i.e. to engage with the brake disk 93, the hydraulic brake 94 may comprise an active hydraulic system to control the pressure of the brake caliper on the braking disk 93. In some examples, the activation and deactivation of the brake 94 may be controlled by a controller 92. In some examples, the controller 92 may be embodied in the wind turbine controller 36. The controller 92 may not only activate or deactivate the brake 94 but it may also actuate on the brake 94 to actively control the pressure of the hydraulic system so as to control the braking moment exerted by the brake 94 when engaging with the brake disk 93. In particular, a moderate braking moment may be exerted during yaw rotation to provide damping during the rotation of the nacelle 16 and an actuation may be needed to increase the braking moment exerted by the brake 94 when stopping rotating of the nacelle 16.

A control system 92 configured to control the yaw system according to a control algorithm is also illustrated in FIG. 3. In this example, a stand-alone control system 92 is depicted. Nevertheless, it is understood that the control of the yaw system may be implemented in any controller, including, e.g. the wind turbine controller 36.

The yaw system of FIG. 3 comprises a bearing 98 of the roller bearing type. Nevertheless, other types of bearings such as gliding yaw bearings are well-known in the art and may also be used in further examples.

The motor illustrated in FIG. 3 may be directly connected to the power supply or it may be connected to the power supply via a variable frequency drive, VFD (not shown in the figure). The use of such VFDs is well-known in the art so no further details are herein provided.

Figure 4:
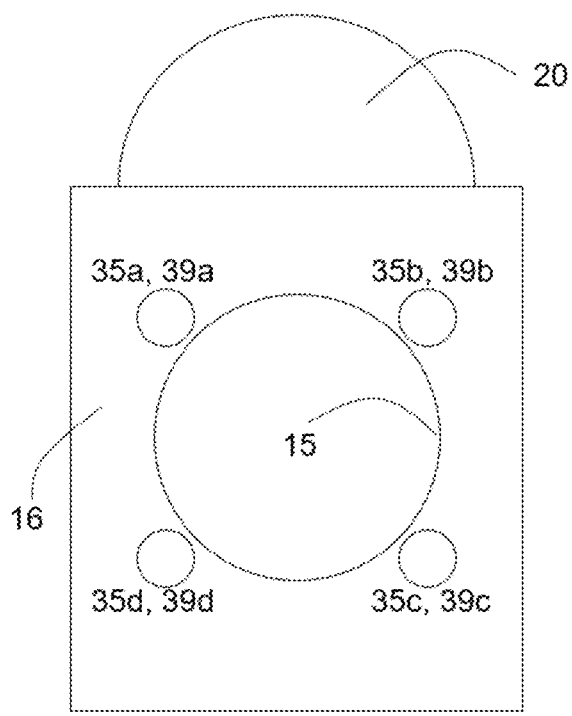
FIG. 4 schematically illustrates an example of a yaw system.

Although a single yaw drive 35 is depicted in FIG. 3, a plurality of yaw drives 35 is typically employed. Accordingly, FIG. 4 schematically illustrates an example of a yaw system comprising a plurality of yaw drives 35. In this example, four yaw drives 35a-35d may be uniformly distributed over the circumference of the yaw bearing (not visible in FIG. 4). As indicated with regard to FIG. 3, each of those yaw drives 35a-35d comprises a pinion 39a-39d that meshes with an annular gear 31. This example will be used in the following to explain the disclosure although it is understood that any number of yaw drives may be selected.

Figure 8A:
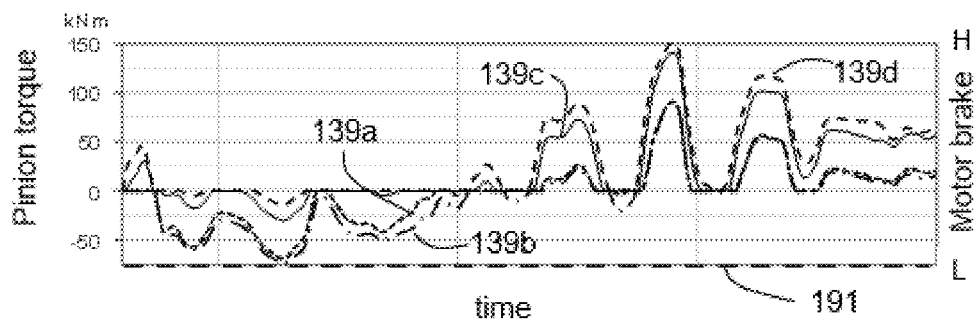
FIGS. 8A-8B schematically illustrates the evolution of torque at the yaw drive pinions as well as the resulting torque imbalance during a yaw system operation according to the prior art.
Figure 8B:
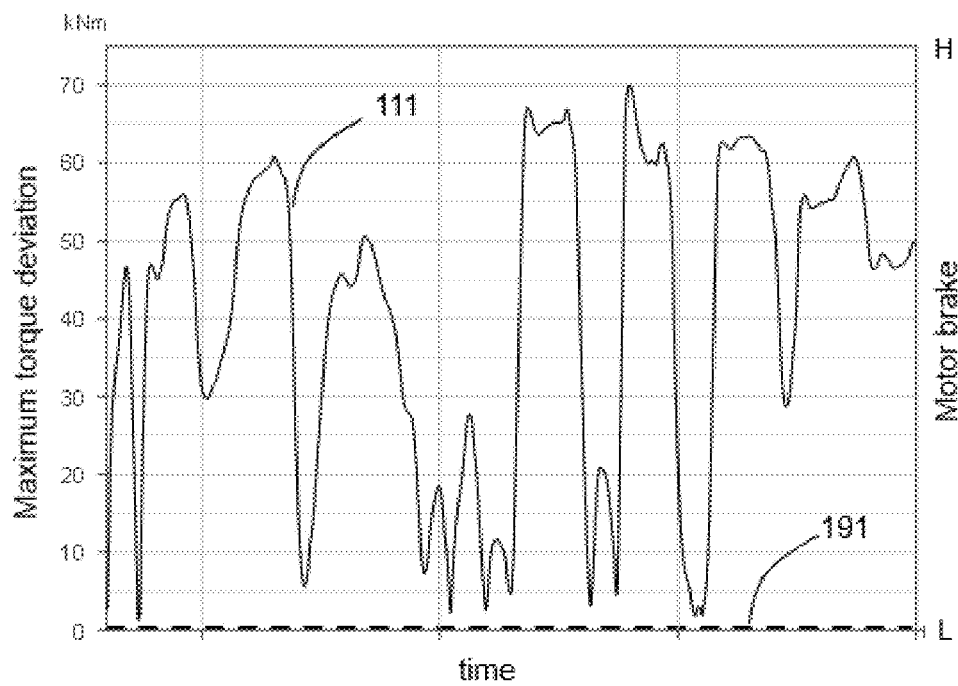

FIGS. 8A-8B depict the evolution of the operating conditions of a yaw system comprising four yaw drives according to a method of the prior-art. The nacelle 16 is not rotating and the braking systems are activated, which corresponds to the non-yawing or parked state representative of most of the lifetime of a wind turbine.

FIG. 8A shows the evolution of the individual torques 139a-139d for each of the four pinions 39a-39d whereas FIG. 8B depicts the evolution of the maximum torque deviation or imbalance 111. In other words, FIG. 8B represents, at each moment, the maximum torque difference among the torques determined for the pinions 39a-39d. A balanced yaw system 35 would exhibit a uniform load sharing among all pinions 39a-39d which would result in substantially the same torque for all pinions 39a-39d and a substantially null value for the maximum torque deviation 111.

Nevertheless, FIG. 8A shows that a variable torque is present at each pinion 39a-39d so that significant excursions are present while in a parked state which include high peak pinion loads. Even more importantly, load sharing is clearly non-uniform and significant values are observed for the maximum torque deviation 111 in FIG. 8B. FIGS. 8A and 8B also show the evolution of the control signal for the motor brakes 191 which, in this case, remains at a low (L) value, which means that the motor brakes 91 are closed, i.e. activated. This is the normal state of the motor brakes 91 for such a non-yawing state of the wind turbine 10.

Inventors have identified a problem during a non-yawing, i.e. a parked, state of the wind turbine 10. The individual arrangement of each pinion 39 with respect to the annular gear 31 results in different engagement positions so that load sharing during non-yawing conditions is not uniform, i.e. pinions are not loaded equally. Different reasons are responsible for said different positions, such as but not limited to, different reaction times for each motor brake 91, non-uniform wear of the components of each motor brake 91 or non-uniform wear of individual pinions 39.

Based on these observations, the inventors have developed new control methods for yaw sequences as explained below.

Figure 5:
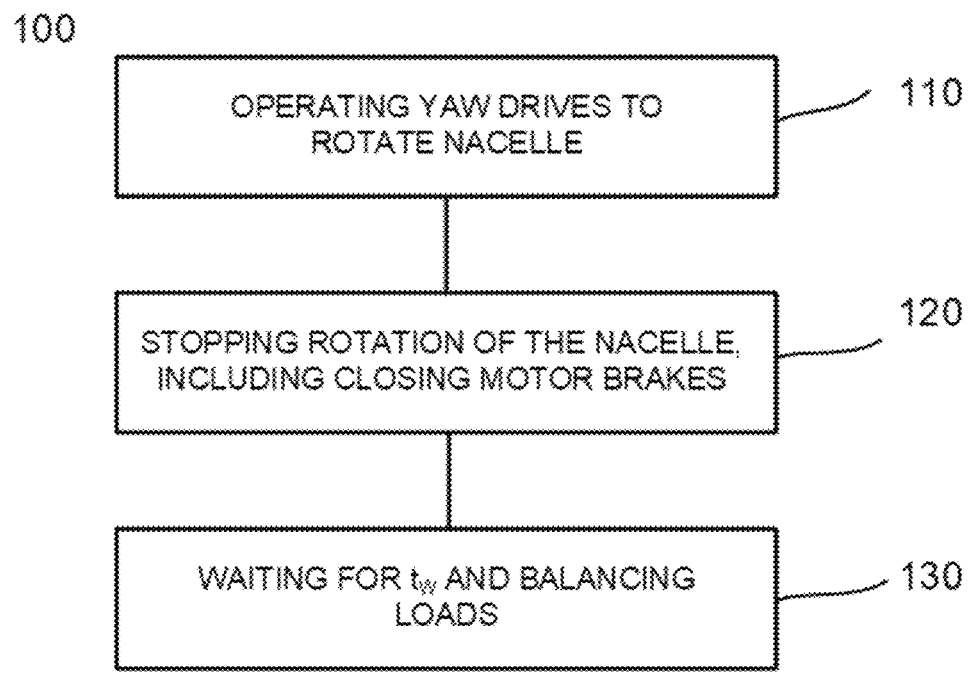
FIG. 5 shows a flowchart of an example of a method for operating a yaw system of a wind turbine.

In an example of the disclosure, a method 100 for operating a yaw system of a wind turbine 10 comprising a yaw bearing 98, an annular gear 31 and a plurality of yaw drives 35 is provided. Each yaw drive 35 comprises a motor 33 with a motor brake 91, a gearbox 37 and a pinion 39 operatively connected with the motor 33. The method 100 is schematically illustrated in the flowchart of FIG. 5. The method comprises, at block 110, operating the plurality of yaw drives to rotate a nacelle with respect to a tower of the wind turbine. The method further comprises, at block 120, stopping rotation of the nacelle with respect to the tower, including closing the motor brakes of the yaw drives. Block 130 of the method comprises, waiting for a waiting time, $t_W$, and balancing loads experienced by the plurality of yaw drives 35 of the yaw system.

In an example of the disclosure, balancing loads experienced by the plurality of yaw drives may comprise temporarily reducing a braking friction. Thus, by reducing the braking friction in the yaw system for a certain period of time, a balancing of loads experienced by the multiple yaw drives may be achieved.

In a further example, balancing loads experienced by the plurality of yaw drives of the yaw system may comprise opening the motor brakes during an opening time, $t_O$, and closing the motor brakes after the opening time.

An example of the disclosure will now be explained with reference to FIGS. 6A-6D, which illustrate the evolution of the operating conditions of a yaw system comprising four yaw drives. Block 110, which comprises operating the yaw drives 35 to rotate the nacelle 16, is represented in FIGS. 6A-6D by the evolution until time, $t_E$, which corresponds to the ending of the yaw operation and, accordingly, to the transition to block 120 of the method 100, which comprises stopping rotation of the nacelle 16. Stopping rotation of the nacelle 16 at $t_E$ comprises stopping the yaw motors 33 and, in this example, simultaneously activating the yaw motor brakes 91 as represented by the yaw motor brakes control signal 191. In other examples, the motor brakes 91 may be closed with a certain delay with respect to stopping the yaw motors 91.

Figure 6A:
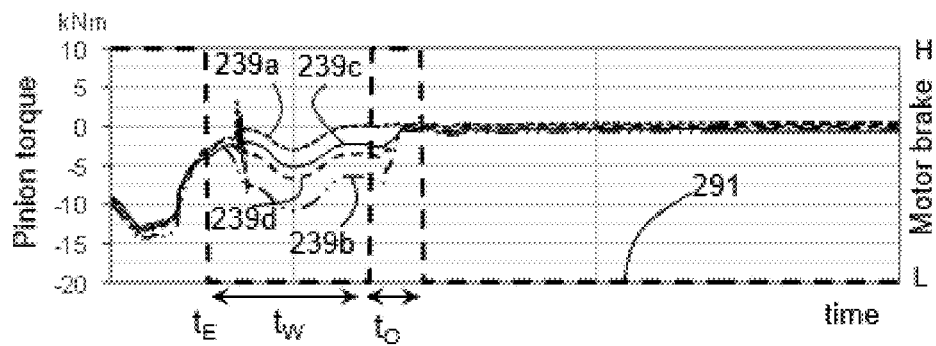
FIGS. 6A-6D schematically illustrates the evolution of torque at the yaw drive pinions as well as the resulting torque imbalance during a yaw system operation according to an example.

FIG. 6A shows the evolution of the torque 239a-239d for each of the four yaw drives as well as the evolution of the motor brakes control signal 291 in an example. The evolution of the pinion torques up to $t_E$ shows relatively moderate values and, more importantly, similar values for all the pinions, which is an indication of a uniform load sharing. During this regime, load balancing may be achieved by the slip of asynchronous motors or, if present, by controlling variable frequency drives (VFDs) used during the operation. The same behavior can also be observed with reference to FIG. 6B, which shows the maximum torque deviation 211 as determined from the torque values at each pinion. As anticipated from the evolution of the individual torques 239a-239b, a substantially uniform load sharing is achieved before $t_E$, which translates in very low values for the maximum torque deviation 211.

Figure 6B:
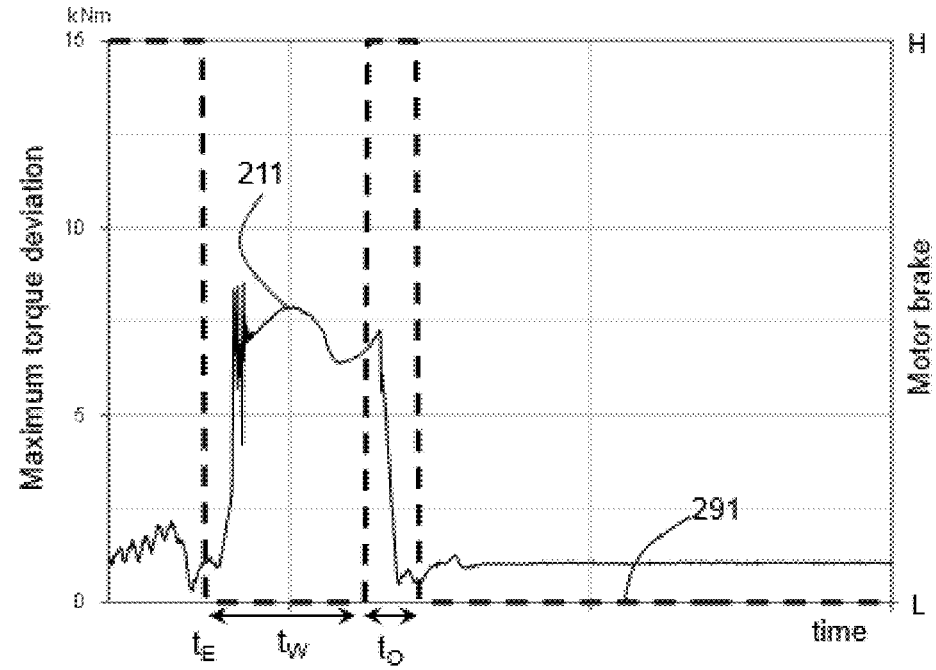

Block 120 corresponds to stopping rotation of the nacelle 16, which involves stopping the yaw motors 33 and includes closing the motor brakes 91. This is represented in FIGS. 6A and 6B by the transition of the motor brake control signal 291 from a high signal (H), indicative of an open state, to a low signal (L), indicative of a closed state. This transition takes place at time, $t_E$. As previously indicated, the motor brakes 91 in this example are closed simultaneously with the stopping of the yaw motors 33. In other examples, the motor brakes 91 may be closed later than the stopping of the yaw motors 33.

After activation of the motor brakes 91, significant deviations can be observed in the torques 239a-239d experienced by the pinions. This behavior is even more evident in FIG. 6B, which depicts the maximum deviation 211 among the determined torques and which clearly shows a significant increase after $t_E$. This behavior is aligned with the behavior observed in the prior-art (see FIGS. 8A-8B).

A waiting time, $t_W$, is present in block 130 of the method 100. Block 130 comprises balancing loads of the yaw drives 35. In the example shown in FIGS. 6A-6D, this balancing load of the yaw drives 35 comprises opening the motor brakes 91 for an opening time, $t_O$, after said waiting time, $t_W$. This is exemplified in FIGS. 6A and 6B by the motor brake control signal 291 remaining in a low (L), i.e. closed state for the duration $t_W$ and then transitioning to a high (H). The waiting time, $t_W$, in this example is defined from the moment the motor brakes 91 are closed which, in this case, coincides with the moment the yaw motors 33 are stopped. The starting time for $t_W$ may be defined differently in other examples. In particular, some examples may comprise closing the motor brakes 91 after stopping the yaw motors 33. In those examples, $t_W$ may be defined with reference to the moment of stopping of the yaw motors 33 or with reference to the moment of closing the motor brakes 91. It is understood that the concept and technical effect remains the same, i.e. a certain time is lapsed until the next action in the sequence takes place.

As also shown in the figures, the motor brakes 91 in this example are opened only for a certain opening time, $t_O$. In other words, in this example, the balancing loads step in Block 130 comprises opening the motor brakes 91 only during an opening time, $t_O$. After completion of the opening time, $t_O$, the motor brakes 91 are closed again, i.e. the motor brake control signal 291 is switched back to a low (L) level. Accordingly, during implementation of the method, the motor brakes 91 undergo an open-close action wherein the motor brakes 91 are released for a period of time, $t_O$.

The effect of this open-close action on the load sharing in the yaw drives 35 is visible in FIGS. 6A and 6B. FIG. 6A shows how the variability among the pinion torque signals 239a-239d is reduced after the completion of the open-close action, i.e. after $t_O$. In other words, the torque signal 239a-239d determined for the different pinions converge to a similar value.

The same behavior is also visible in FIG. 6B, which shows a significant reduction on the maximum torque deviation 211 after carrying out the open-close action for the motor brakes 91. More particularly, a fast reduction on the maximum torque deviation 211 is observed within the opening time, $t_O$, until a very low value, indicative of a substantially uniform load sharing, is observed. This observation indicates that the residual loads at the pinions 91 are relaxed by the opening action of the motor brakes 91 and an improved load sharing is achieved. In other words, the open-close action of the motor brakes 91 is a load balancing action for the yaw drives. Once relaxed after the open-close action of the motor brakes 91, the yaw system remains substantially balanced and a very low value is observed for the maximum torque deviation 211 after time $t_O$.

Figure 6C:
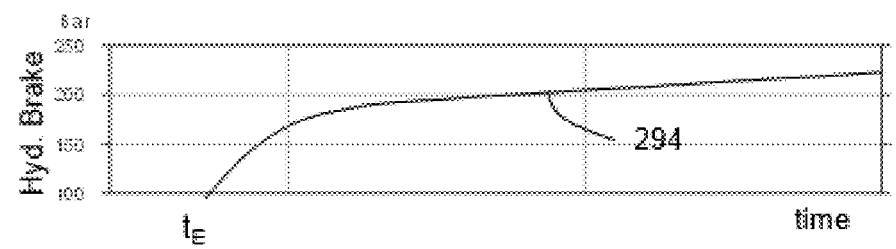

In an example of the disclosure, the yaw system may comprise a hydraulic brake 94 and the method may further comprise holding the nacelle 16 substantially in position with the hydraulic brake 94 during the balancing of loads. More specifically, balancing loads may comprise opening the motor brakes 91 during an opening time, $t_O$, and holding the nacelle 16 substantially in position with the hydraulic brake 94 may comprise holding the nacelle 16 substantially in position during the opening time, $t_O$, of the motor brakes 91. This example is also illustrated by FIGS. 6A-6D. More particularly, FIG. 6C depicts the evolution of the hydraulic pressure 294 of the hydraulic brake 94, which may remain at a moderate value (e.g. 20-40% of its rated value) during yawing of the nacelle 16, i.e. before the time $t_E$. The hydraulic brake 94 may be actuated at $t_E$ in order to increase its braking torque to support stopping rotation of the nacelle 16.

According to the example shown in FIGS. 6A-6D, by the time the motor brakes 91 are opened during a time $t_O$, the hydraulic brake 94 may be at a sufficiently high pressure, e.g. 80% of its rated value, to hold the nacelle 16 in position. This use of a hydraulic brake 94 in this example may allow for an improved stability of the operation as it may prevent unwanted movements of the nacelle 15 resulting from, e.g. wind gusts occurring during implementation of the method. This example may be specifically useful for wind turbines comprising yaw systems featuring yaw bearings 98 of the roller type. Alternatively, other examples of the disclosure may not use hydraulic brakes 94 to hold the position of the nacelle 16 while opening the motor brakes 91, in which case the inertia of the nacelle 16 itself may be used with that purpose.

In an example of the disclosure, the method may be carried out while the wind turbine is in "normal operation", i.e. in a power production mode. In this example, alignment of the rotor 18 of the wind turbine 10 with the wind direction 28 may be used to optimize power production. To that end, the nacelle 16 may be rotated with respect to the tower 15 until a yaw error, i.e. a difference between the rotor axis 30 and the prevailing wind direction 28 is below a certain threshold.

Once aligned, the nacelle 16 may be retained by means of a retention system comprising, among others, the motor brakes 91 of the yaw motors 33 and the pinions 39, which may remain engaged with the annular gear 31. Nevertheless, different factors such as varying wind conditions or the operating conditions of the wind turbine 10 may induce varying loads and, more specifically, may induce a varying moment about the vertical axis 39 of the tower 15. Said moment about the vertical axis 30 of the tower 15 may be referred as a Q-moment. Said loads may increase the torque experienced by the yaw pinions 39 and, more specifically, they may result in an imbalance, wherein at least the loads in some of the pinions 39 may exceed the design values. Consequently, the method according to this example may be carried out to mitigate the risk of a potential damage of the yaw system components while in power production mode.

In another example of a method according to the disclosure, the method may be carried out while the wind turbine is in idling mode, i.e. in a mode of operation in which no power is generated. In this case, there is no need to align the rotor axis 30 to optimize power production. Nevertheless, significant loads may be induced in the wind turbine by wind or, in the case of offshore wind turbine, by sea waves. For that reason, the yaw system may be used to orient the nacelle 16 according to a preferred orientation.

In some examples, said orientation may be an orientation aligned and facing the wind (upwind orientation) or an orientation wherein the rotor 18 is aligned at 180° with respect to the incoming wind direction (i.e. downwind orientation). In further examples, loads may be mitigated by moving the rotor 18 out of the wind direction 28 by rotating the nacelle 16 in a controlled manner. In any case, the position of the nacelle 16 with respect to the tower 15 may be also retained and, similarly to the previous example, some loads may be experienced by the yaw drives 35 and the yaw system in general while retaining the nacelle 16 in position. For that reason, an open-close action of the motor brakes 91 may be also implemented in this situation to mitigate risks associated to high loading and, more specifically, to improve load sharing among the yaw pinions 39 of the yaw drives 35.

FIGS. 6A and 6B show that the motor brake 91 is opened after a waiting time, $t_W$. This is indicated by the transition of the motor brake control signal 291 from a low (L) to a high (H) value. Different criteria may be used to determine the magnitude of said waiting time.

In an example of the disclosure, the waiting time may be a predetermined amount of time, e.g. a predetermined amount of time from the actuation of the motor brakes 91. To this end, simulations and pre-analysis may be conducted to determine the optimum amount of time needed to increase the benefits of the method. In particular, the waiting time may be enough for the yaw system to reach a certain equilibrium after stopping the nacelle rotation. As previously described, said equilibrium state may comprise some unbalanced residual loads on the yaw pinions 39, which may then be released by opening the motor brakes 91 in an open-close action after the predetermined time, $t_W$.

In other examples of the disclosure, an adaptive method may be implemented. To this end, the waiting time may be determined on the basis of an operating condition of the wind turbine and/or on an environmental condition. Said operating conditions may be monitored in real-time so as to adapt the method to the prevailing conditions.

Figure 6D:
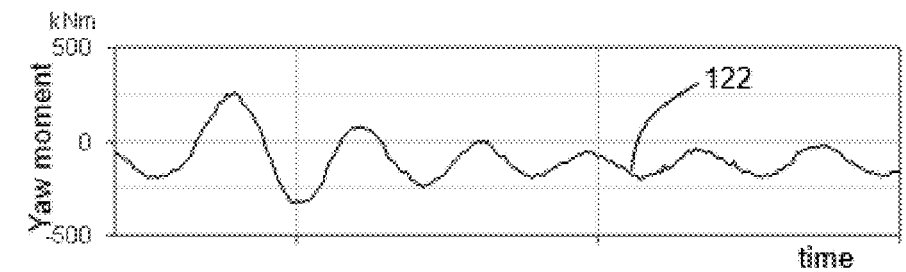

More specifically, an example of the method may comprise a waiting time that may depend on the yaw moment (Q-moment) and/or on a rate of change of the yaw moment (yaw moment slope). The yaw moment refers to the moment experienced by the yaw system about the vertical axis of the tower 15 and it represents the moment that the different retaining system (inertia of the nacelle 16, motor brakes 91, pinions 39 meshing with the annular gear 31, etc.) may withstand in order to retain the nacelle 16 in position. In some cases, said yaw moment may oscillate, more specifically, with a frequency related to the rotation of the rotor 18 and the blades 22, which may also result in some pinions 39 becoming periodically overloaded. Accordingly, the determination of the yaw moment may provide an indication of a potential imbalance and overloading situation. FIG. 6D shows the evolution of the yaw moment 122 during a yaw sequence according to an example.

In a variant of this example, the rate of change of the yaw moment may determine the waiting time, $t_W$. Thus, a high rate of change may be indicative of the proximity of a scenario that may result in excessive loading or excessive imbalance in the yaw drives 35 and, more particularly, in the yaw pinions 39. Accordingly, a shorter waiting time, $t_W$, may be used in case of a high rate of change of the yaw moment whereas a longer waiting time, $t_W$, may result from a more stable scenario showing less variability in the yaw moment.

In another example comprising variable, i.e. non predetermined, waiting times, the waiting time may be based on a speed and/or on an acceleration of the nacelle about the longitudinal axis of the tower. Said variables may be detected by appropriate sensors, e.g. a yaw speed encoder may be arranged to measure the rotational speed of the nacelle 16 and said information may determine the waiting time. After initiating the stopping of the nacelle 16 at $t_E$, it may still take some time before the nacelle 16 comes to a stop so that motor brakes 91 can be safely released. In this example, the nacelle speed and/or acceleration may be used to monitor the deceleration of the nacelle 16 after closing the motor brakes 91 so as to determine the precise moment when the nacelle 16 is effectively stopped, this moment representing the earliest time when the motor brakes 91 may be opened or, in other words, the earliest waiting time, $t_W$. As a non-limiting example, this situation may be characterized by a nacelle rotational speed within ±0.1 deg/s.

In still another example, the waiting time, $t_W$, may be based on a determination of an imbalance of the pinion loads. In this example, torque transducers may be arranged at the yaw drives 35 to measure the torque suffered by each of them. In some variants, torque may be determined in an indirect manner by using a transfer function between the torque and an electrical current consumption as measured in a VFD (if present). The waiting time, $t_W$, may directly result from the loads suffered by the pinions. Consequently, the open-close action or balancing action of the motor brakes 91 may only be carried out if required, i.e. only if a significant imbalance is detected. To this end, a certain threshold may be defined for the maximum allowed torque deviation among yaw pinions 39 so that a signal to open the motor brakes 91 for a certain opening time, $t_O$, may be provided if the determined maximum torque deviation exceeds said threshold.

Other examples may comprise other operating and/or environmental conditions such as individual yaw motor torque, wear status of the hydraulic brake 94, wear status of the motor brakes 91 or ambient temperature.

Different approaches may be used to determine the waiting time for those examples wherein an operating condition of the wind turbine is to be considered. In particular, a look-up-table relating different waiting times to different ranges of the considered operating parameters may be implemented. Alternatively, analytical functions defining a mathematical relationship between the waiting time and the operating parameter may also be used in other variants of these examples.

In examples of the present disclosure, the waiting time may be between 0.5 and 600 seconds, specifically between 1 and 10 seconds and, more specifically, between 2 and 4 seconds, taken from the moment the motor brakes are closed. Thus, regardless of the method used to determine the waiting time, i.e. either predetermined or based on an operating condition, certain lower and upper limits may be defined for specific examples. On the one hand, a lower limit may be used to ensure the method is only carried out after reaching a certain equilibrium after closing the motor brakes 91. On the other hand, an upper limit may be used so that the method is carried out even in those cases where operating conditions may not be very demanding. Such actuation may be useful to release any residual loads in the yaw pinions 91 in a preventive manner even if prevailing operating conditions may be relatively acceptable.

In examples comprising opening the motor brakes 91 for an opening time, $t_O$, the opening time, $t_O$, i.e. the time during which the motor brakes 91 are opened, may also be selected according to different criteria. The opening time may be predetermined or it may be based on an operating condition of the wind turbine. In particular, a lower limit may be defined, which may be enough for the yaw system to release the residual loads on the yaw pinions 39. Said minimum time may be dependent on different design characteristics and, more specifically, it may depend on the reaction time of the motor brakes 91. The reaction time of the motor brakes 91 may be dependent on the design of the system but also on the condition of the motor brakes 91, e.g. wear of the friction elements or state of the electrical connection.

On the other hand, an upper limit may also be defined for the opening time, $t_O$. In particular, the opening of the motor brakes 91 during to implies that less braking torque is applied to the nacelle 16 during a certain time period to hold its position. Consequently, a prolonged period of time may increase the risk of the nacelle 16 slipping if, e.g. a wind gust occurs. To mitigate that risk, an upper limit may also be defined for the opening time. The upper limit may be predefined or it may be adjusted depending on operating conditions such as yaw moment, nacelle inertia, nacelle rotational speed and/or environmental conditions. Accordingly, an example of the disclosure may comprise that the opening time may be between 0.02 and 1 seconds, specifically between 0.05 and 0.5 seconds and, more specifically, between 0.2 and 0.4 seconds.

In examples of the present disclosure, the method may comprise repeating at least once the step of balancing loads experienced by the plurality of yaw drives of the yaw system. More specifically, examples may comprise repeating at least one the steps of opening, after a waiting time, the motor brake during an opening time and closing the motor brake after the opening time. In other words, in some examples, multiple open-close actions may be carried out for the motor brakes 91 to reduce the load imbalance more effectively. More specifically, shorter open-close actions may be preferred in this example than in previous examples. Furthermore, the specific parameters for each repetition may be adjusted. An example may comprise using the same waiting time and the same opening time for one or more of the repetitions but other examples may comprise using different times for the different load balancing actions. The respective times may be determined according to some predefined analysis or they may be determined on the basis of real-time operating conditions of the wind turbine.

In still another example comprising repetitive load balancing actions, the number of repetitions may be based on operating conditions and, more specifically, on the yaw moment. According to this example, not only the waiting, $t_W$, and opening, $t_O$, times for the open-close action(s) may be selected but, in case of multiple actions, the number of repetitions may be adjusted depending on observed operating conditions. More specifically, the yaw moment may be monitored and it may be used to define the number of repetitions in such a manner that a larger number of repetitions may be carried out for high values of the yaw moment. In another example of the disclosure, the number of repetitions may be adjusted depending on the evolution of the yaw moment over a certain time window. Thus, after conducting a first open-close action, a certain time window of, e.g. between 30 and 60 seconds, may be defined during which, if the yaw moment exceeds a certain threshold, a further open-close action may be performed. The process may be repeated as deemed necessary as defined by, e.g. the magnitude of the yaw moment and/or the pinion load imbalance.

In other examples of the disclosure, other operating conditions like the yaw pinion torque or an imbalance between the pinions loads may be used as inputs to determine the number of repetitions.

Yaw systems according to this disclose comprise a plurality of yaw drives 35. An example is provided in FIG. 3 for a yaw system comprising four yaw drives 35. Nevertheless, a different number of yaw drives 35 and, more specifically, a larger number of yaw drives 35 may be used. This may be particularly the case for wind turbines 10 exhibiting power ratings in excess of 10 MW, for which more than ten, e.g. sixteen, yaw drives 35 may be provided. In an example of the present disclosure, the yaw drives 35 may be split into a plurality of groups, each group comprising at least one yaw drive 35. The method may then comprise carrying out the steps of balancing loads experienced by the plurality of yaw drives of the yaw system in a sequential manner for the yaw drives of the different groups. More specifically, in examples of the disclosure, the method may comprise carrying out the steps of opening the motor brakes 91 during an opening time after a waiting time and closing the motor brakes 91 after the opening time for the yaw drives 35 of a group. These steps may be carried out in a sequential manner for the different groups. In other words, this method provides for a sequence of open-close actions, wherein each load balancing action is carried out for the motor brakes 91 of a different group of yaw drives 35. This may be specifically useful for very large wind turbines comprising an elevated number of yaw drives 35, in which case coordination may be facilitated by splitting into different groups. In a variant of this example, each group may comprise a single yaw drive 35, in which case the motor brakes 91 may be actuated in sequence, i.e. one by one.

More specifically, when having a large number of yaw drives 35, an example of the disclosure may comprise forming groups of yaw drives 35, which may be actively tensioned against the bearing 98 in a specific direction. As an example, yaw drives 35 of a first group may be tensioned in a clockwise (CW) directions whereas yaw drives 35 of a second group may be tensioned in a counterclockwise (CCW) direction. This may be practiced to reduce the influence of gear backlash, thus reducing nacelle oscillation and improving directional stability. The open-close action may be carried out in a sequential manner for the yaw drives 35 of each such group.

As shown in FIG. 4 and as discussed with reference to FIGS. 6A-6D, yaw systems may comprise hydraulic brakes 94 to control and/or retain the yaw movement of the nacelle 16. It is known that a certain hydraulic pressure may be applied to the hydraulic brakes during yawing of the nacelle 16. This may be done to provide some damping during the operation so that a more stable move is obtained. This may particularly be the case when employing yaw bearings of the roller type. Although the applied braking torque may depend on specific design consideration, a braking torque in the range of 20-40% of the rated value may be applied.

Another example of a method for controlling a yaw system is provided for a system comprising a hydraulic brake. This example comprises actuating the hydraulic brake 94 to increase the braking pressure with respect to its value during the yawing movement before stopping rotation of the nacelle 16 with respect to the tower 15 including closing the motor brakes 91 of the yaw drives 35. As a result of this early activation of the hydraulic brake 94, the braking torque induced by the hydraulic brake 94 may increase above its value during the yawing operation in anticipation of a stopping of the yaw rotation. Such early activation may result in a faster and more controlled stopping of the nacelle 16 after closing the motor brakes 91 which may reduce load imbalance among the different yaw drives 35.

Early activation of the hydraulic brake 94 is interpreted as meaning that the hydraulic brake 94 is activated before the yaw stopping sequence is started, i.e. earlier than the stopping of the yaw motors 33 and the activation of the motor brakes 91. The amount of time of the early activation determines the braking moment exerted by the hydraulic brake 94 by the time the nacelle stopping sequence is started. Thus, in examples of the disclosure, the hydraulic brake 94 may be actuated a predetermined time in advance of closing the motor brakes 91, the predetermined time being at least 1000 ms. Said predetermined time may depend on design considerations of the yaw system and, more particularly, on design considerations of the hydraulic brake 94 and the associated hydraulic system.

In a specific example, the predetermined time may be selected so as to ensure a certain level of braking pressure in the hydraulic brake 94, more specifically, to ensure at least 80% of the rated braking pressure in the hydraulic brake 94 by the time the motor brakes 91 are closed at $t_E$ which, in an example, may corresponds also to the time when the yaw motors 33 are stopped. As already mentioned, in other examples the motor brakes 91 may not be actuated simultaneously with but rather later than the stopping of the yaw motors 33. In those examples, $t_E$ (moment of initiating the stopping of the rotation of the nacelle) may be defined by the stopping of the yaw motors 33 and the time for early activation of the hydraulic brake 94 may be defined in reference to the stopping of the motors 33 and not in reference to the activation of the motor brakes 91. In any case, regardless of the definition, the effect may remain that a higher braking torque than the one exerted during normal yawing of the nacelle 16 is achieved prior to the initiation of the yaw stopping sequence.

Figure 7:
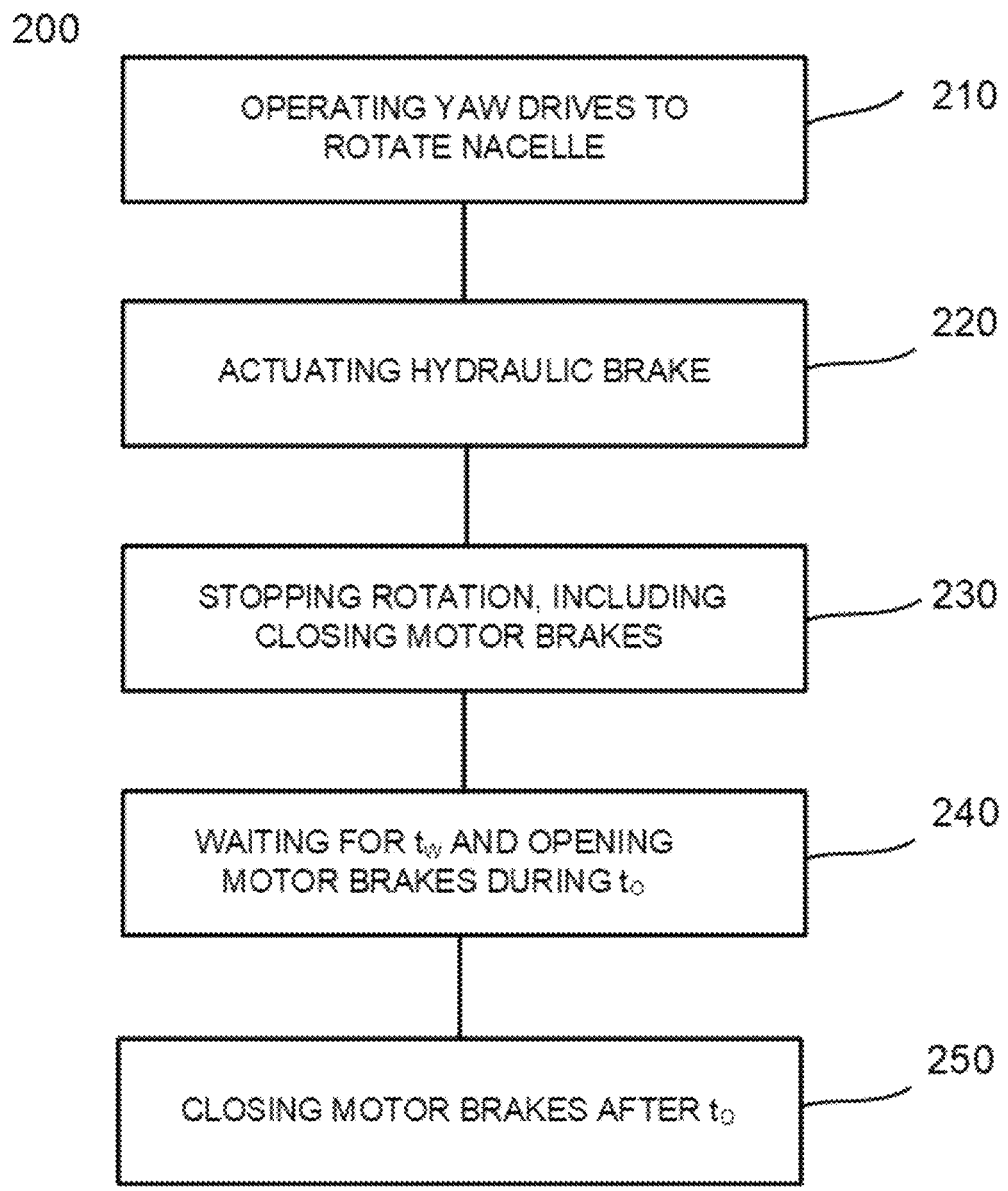
FIG. 7 shows a flowchart of another example of a method for operating a yaw system of a wind turbine.

FIG. 7 provides a flowchart to further illustrate a method 200 for controlling a yaw system, wherein the yaw system comprises a hydraulic brake 94. The method 200 comprises, in block 210, operating the plurality of yaw drives to rotate a nacelle 16 with respect to a tower 15 of the wind turbine 10. Then, at block 220, the method comprises actuating the hydraulic brake 94 to increase the braking pressure with respect to its value during rotation of the nacelle 16. Subsequently, block 230 of the method comprises stopping rotation of the nacelle 16 with respect to the tower 15, including closing the motor brakes 91 of the yaw drives 35. Subsequently, after a waiting time, the method comprises opening the motor brakes 91 during an opening time in block 240 of the method. Finally, block 250 comprises closing the motor brakes 91 after the opening time.

In this manner, this method comprises an early activation of the hydraulic brake 94 before stopping rotation of the nacelle 16 and a subsequent open-close action for the motor brakes 91 to release residual loads in the yaw drives 35, thus favoring an adequate load sharing among the multiple yaw pinions 39. In some variants of this method, the time for early activation of the hydraulic brake 94 before stopping rotating of the nacelle 16, i.e. before $t_E$, may be predetermined. More specifically, a time may be predetermined by means of simulations and it may be selected to ensure a certain braking pressure. In other variants, the time for the anticipated activation of the hydraulic brake 94 may be variable and dependent on operating conditions such as prevailing wind speed.

According to another aspect of the disclosure, a controller 92 may be provided. The controller 92 may be configured to perform any examples the methods of operating a yaw system as described throughout this disclosure or any equivalent examples (including combinations). The controller 92 may be implemented as a stand-alone controller to control the yaw system or it may be implemented as part of the wind turbine controller 36.

The controller 92 may be configured to receive a plurality of signals 501, such as signals indicative of wind direction 28, nacelle 16 orientation with respect to the tower 15, torque at the pinions 39, Q-moment, nacelle speed, nacelle acceleration, etc. The controller 92 may use that information to obtain a plurality of signals 502 to control the yaw system. This may include signals 502 to control the yaw motors 33, the motor brakes 91, specifically during open-close actions, or the hydraulic brake 94.

According to another aspect of the disclosure, a wind turbine 10 comprising a tower 15, a nacelle 16 rotatably mounted on top of the tower 15, a wind turbine rotor 18 including a plurality of wind turbine blades 22 and a yaw system may be provided. The wind turbine may comprise a controller 92 configured to perform the methods as described throughout this disclosure or any equivalent examples (including combinations).

This written description uses examples to disclose the teaching, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various examples described, as well as other known equivalents for each such aspects, can be mixed and matched by one of ordinary skill in the art to construct additional examples and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a yaw system of a wind turbine, the wind turbine including a tower and a nacelle that rotates relative to the tower, the yaw system including a yaw bearing, an annular gear, and a plurality of yaw drives that include a motor with a motor brake, a gearbox, and a pinion operatively connected with the motor, the method comprising:
    operating the plurality of yaw drives to rotate the nacelle with respect to the tower;
    stopping rotation of the nacelle with respect to the tower to include closing the motor brakes of the yaw drives;
    after a predefined waiting time with the motor brakes closed, balancing loads experienced by the plurality of yaw drives of the yaw system by:
        reducing a braking friction applied by the motor brakes by opening the motor brakes for a predefined opening time and subsequently closing the motor brakes after the opening time;
        wherein the opening time has a minimum time value of 0.02 seconds based on a reaction time and wear characteristics of the motor brakes, and a maximum time value of 1.0 seconds based on one or more operating conditions of the wind turbine including yaw moment, nacelle inertia, nacelle rotational speed, and environmental conditions.

2. The method of claim 1, wherein the yaw system includes a hydraulic brake, the method further comprising holding the nacelle in position with the hydraulic brake during the balancing of loads experienced by the plurality of yaw drives of the yaw system.

3. The method of claim 1, comprising carrying out the method while the wind turbine is in a power production mode.

4. The method of claim 1, comprising carrying out the method while the wind turbine is in an idling mode.

5. The method of claim 1, wherein the waiting time is between 0.5 and 6.00 seconds.

6. The method of claim 5, wherein the waiting time is determined based on at least one of a yaw moment, a rate of change of the yaw moment, a speed of the nacelle about a longitudinal axis of the tower, an acceleration of the nacelle about the longitudinal axis of the tower, or an imbalance of loads on the pinions.

7. The method of claim 1, comprising repeating at least once the step of balancing loads experienced by the plurality of yaw drives of the yaw system.

8. The method of claim 7, wherein the step of repeating at least once the step of balancing loads experienced by the plurality of yaw drives of the yaw system comprises repeating at least once the steps of opening, after an additional waiting time, the motor brake for an additional opening time and closing the motor brake after the additional opening time.

9. The method of claim 1, wherein the yaw system includes a hydraulic brake, the method comprising actuating the hydraulic brake a predetermined time in advance of closing the motor brakes and before stopping rotation of the nacelle with respect to the tower so as to increase braking pressure during the yawing movement.

10. The method of claim 1, wherein the plurality of yaw drives are divided into a plurality of groups each comprising at least one yaw drive, the method comprising carrying out the step of balancing loads experienced by the plurality of yaw drives of the yaw system in a sequential manner for the yaw drives of the different groups.

11. A control system for a wind turbine, wherein the control system is configured to perform the method according to claim 1.

12. A wind turbine, comprising:

a tower;

a nacelle rotatably mounted on the tower;

a yaw system configured to rotate the nacelle with respect to the tower around a longitudinal axis of the tower; and a control system configured to operate the yaw system according to the method of claim 1.

* * * * *